(12) United States Patent
Neal (10) Patent No.: US 7,134,240 B1
(45) Date of Patent: Nov. 14, 2006

(54) ROCK-A-BYE ROTARY SPROUTER AND SANITIZER

(76) Inventor: Lincoln Neal, 220 Battlefield Rd., Cookeville, TN (US) 38506

( * ) Notice: Subject to any disclaimer, the term of this patent is extended or adjusted under 35 U.S.C. 154(b) by 0 days.

(21) Appl. No.: 10/970,736

(22) Filed: Oct. 18, 2004

Related U.S. Application Data (60) Provisional application No. 60/511,895, filed on Oct. 16, 2003.

(51) Int. Cl.
*A01G 31/00* (2006.01)

(52) U.S. Cl. .......................................... 47/60
(58) Field of Classification Search ................. 47/14, 47/56, 61, 58.1 SE
See application file for complete search history.

(56) References Cited

U.S. PATENT DOCUMENTS

| | | | | |
|---|---|---|---|---|
| 1,724,949 | A | * | 8/1929 | Markey et al. ............... 47/14 |
| 3,167,890 | A | * | 2/1965 | Smith ........................ 451/328 |
| 3,731,797 | A | * | 5/1973 | Tanner ....................... 209/700 |
| 4,461,096 | A | * | 7/1984 | Suzuki ........................ 34/573 |
| 4,682,613 | A | * | 7/1987 | DeLoach ................... 134/58 R |
| 6,840,007 | B1 | * | 1/2005 | Leduc et al. ............... 47/62 C |
| 2003/0085234 | A1 | * | 5/2003 | Paumen et al. ............. 220/912 |
| 2004/0237396 | A1 | * | 12/2004 | Castillo ....................... 47/61 |

FOREIGN PATENT DOCUMENTS

| | | | | |
|---|---|---|---|---|
| JP | 60227648 | A | * | 11/1985 |
| JP | 6030748 | A | * | 7/1992 |
| JP | 06030748 | A | * | 2/1994 |
| JP | 406113609 | A | * | 4/1994 |
| JP | 406284821 | A | * | 10/1994 |

OTHER PUBLICATIONS

Rota-Tech Sprout Production System;☐☐www.sproutnet.com.*
Rota-Tech Sprout Production System;☐☐http://sproutnet.com/rota-tech$_{13}$ sprouting_system.htm.*
Rota-Tech Seed Sanitation;☐☐http://sproutnet.com/sprouting_seed_sanitation_equipment.htm.*

* cited by examiner

*Primary Examiner*—Francis T. Palo

(57) ABSTRACT

The introduction of a slow rocking or tilting action that can tilt the growing chambers of a rotary sprouter back so that they become containment vessels for holding water or cleaning solution thereby transforming the rotary sprouter into becoming a front-load type sprout washing machine. The frame supporting the chambers is supported by pivots that enable push/pull actuators to tilt the frame and growing chambers back and forth. The rotation coupled with the slow rocking motion effects agitation of the solution and product inside thus providing for effective washing action for both seed and sprouts. The washing action is place under automatic control to effect washing cycles that can be repeated as frequent and as many times as is necessary for disinfecting the sprouts.

4 Claims, 12 Drawing Sheets

ROCK-A-BYE ROTARY SPROUTER AND SANITIZER

CROSS-REFERENCE TO RELATED APPLICATION

This application claims the benefit of provisional patent application Ser. No. 60/511,895, filed 2003 Oct. 16 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to providing a practical means for washing and disinfecting edible sprouts concurrently with propagation for producing sprouts free of dangerous pathogens, specifically to transform the rotary sprouting-type machine into an effective washing machine that can repeatedly, persistently, and automatically wash and disinfect seed and subsequent sprouts while providing key functionalities that improve overall sprout quality, increase shelf life, and help make rot-prone "bad" seed produce consistently good sprouts.

2. Prior Art

Dilemma Facing the Sprouting Industry:

Sprouts such as alfalfa, broccoli, radish, clover, onion, and various bean sprouts are often eaten raw. They are generally considered to be highly nutritious and many find them to be satisfyingly tasty. However, over the past 15 years there have been multiple outbreaks of foodborne illnesses associated with the consumption of sprouts affecting thousands of people worldwide. These outbreaks have been so numerous and subsequently publicized that in recent years sales of alfalfa and similar sprouts have dropped significantly.

Since 1999, the Food and Drug Administration (FDA) has warned consumers against eating raw sprouts due to an inordinately high number of people contracting foodborne illnesses from eating raw sprouts. (Federal Register/vol. 64, No. 207/1999 Oct. 27). The foodborne pathogenic health risk associated with sprouts has been significant not only in the United States but also abroad. For example:

"Between January 1995 and May 1999, there were 11 reported outbreaks in the united States associated with sprouts from commercial growers, 9 of which were due to various salmonella serotypes and 2 to *Escherichia coli* 0157." (Federal Register/vol 64, No. 207/1999 Oct. 27) In a 1996 outbreak, over 450 cases of infection occurred from eating salmonella-infected alfalfa sprouts resulting in one elderly person dying from sepsis. (Food safety Network Technical Report #16, 2000 July)

"During May through August 1996, approximately 10,000 cases of *Escherichia coli* 0157:H7 infection associated with at least 14 separate clusters were reported in Japan. Most cases occurred in school-age children" (Emerging Infections Diseases, Vol. 5 No. 3, May–June, published by the CDC.) White radish sprouts were implicated in this outbreak which goes on record as the world's largest reported outbreak of *E-coli* 0157:H7 infection ever reported. (Food Safety Network Technical Report #16, 2000 July)

In 2004 alone as of August, there has already been nine sprout-related product recalls in the United states as listed on the FDA'S website.

Following recent outbreaks of salmonella Bovisorbificans in Oregon and Washington, a Jun. 3, 2004, "FDA Statement" warned: "FDA is reiterating its previous alert about eating raw sprouts. Those persons who wish to reduce the risk of foodborne illness from sprouts are advised not to eat raw sprouts."

Pathogen Propensity High:

"Raw sprouts present unique food safety problems because conditions under which they are produced—growing time, temperature, water activity, pH (a measure of acidity) and nutrients—are ideal for the rapid growth of bacteria. If pathogens are present on or in the seed, these conditions are likely to encourage proliferation."(HHS News, 1999 October, published by U.S. Dept. of Human Health Services). "FDA believes that the seed is the source of contamination in most of the foodborne illness outbreaks associated with sprout consumption." ("Note to Firms that Grow, Condition, Store, or Distribute seed for Sprouting and to Firms that Produce, Pack, or Ship Fresh sprouts," Terry C. Troxell, Ph.D., FDA, 2004 Aug. 19) "Microbiological analyses have shown that alfalfa seeds routinely contained high levels of microbial flora, including coliforms and fecal coliforms. Of even greater public health significance however, is the fact that pathogens can exceed $10^7$ per gram of sprouts without affecting the appearance of the product." (*Food safety Network Technical Report* #16, 2000 July)

Unfortunately, sprouts have an inherent propensity toward proliferating pathogens as the following research results suggest: "Bacterial flora of sprouts were often two to ten logs higher than that observed in seeds. *E Coli* 0157:H7 inoculated onto alfalfa seeds was shown to reach $10^6$ to $10^7$ cfu/g within 48 hours after the sprouting process began. Additionally, low levels of *Salmonella* species seeded into alfalfa seeds have been shown to increase by as much as four to five log in germinating sprouts. Therefore, the contamination of seeds with a few pathogens can potentially be amplified by the sprouting process and become a microbiological hazard." ("Risks Associated with the consumption of Fresh Sprouts," sylvanus Thompsons and D. A. Powell, *Food Safety Network Technical Report* #16, 2000 July)

So what is it with the prior art that, as mentioned above, such hazardous pathogens are "amplified" by? The article above goes on to explain: "These excellent conditions for bacterial growth are further facilitated by the fact that the sprouting process has no inherent kill steps that either prevent bacterial growth or eliminate them entirely." ("Risks Associated with the consumption of Fresh Sprouts," sylvanus Thompsons and D. A. Powell, *Food safety Network Technical Report* #16, 2000 July) The "sprouting process" must mentioned implicates the prior art prior-art equipment and methods used in the industry as being inept—even encouraging hazardous bacteria growth and proliferation. Consequently the industry is in serious trouble today, as noted above and herein.

My invention offers a practical means for eliminating such bacteria during and throughout the sprouting process by providing a virtual one-step procedure that is easy, requires less labor, is economical, yet is highly effective at killing the germs as the disclosure herein describes.

Pathogens that Have Been Implicated:

What are the foodborne offenders causing such an alarming health risk associated with eating raw sprouts? "There are several pathogens that have either been implicated in sprout-associated outbreaks or that have been identified as being a potential source of increased risk due to their ability to proliferate during sprouting. These include *Salmonella, Enterohemorrhagic E coli, Bacillus cereus, Listeria monocytogenes, Yersinia entreocolitica* and *Shigella* species. However, only *Salmonella* and Enterohemorrhagic *E coli* 0157:H7 have consistently been linked with sprout-associated outbreaks." ("Risks Associated with the Consumption of Fresh sprouts," sylvanus Thompsons and D. A. Powell, *Food safety Network Technical Report* #16, 2000 July)

Prior Art—How Sprouting is Done Commercially:

Alfalfa, broccoli, radish, clover, onion, and similar sprouts are all sprouted in very similar ways and generally take 3–6 days from seed to finished product. The time needed for producing the finished product depends on the seed-type as well as the water and ambient temperatures. Clean water and good seed are the only ingredients—no soil, no nutrient-fortified water as is the case with hydroponics.

To begin a sprout crop with the prior art, the seed is first washed—usually in a strong chlorine solution followed by a clean-water rinse. Next, the washed seed is loaded into a "rotary sprouter" machine, also sometimes referred to as a "rotary drum." Such machines are very common. Virtually every grower in the business of producing alfalfa sprouts uses rotary sprouter machines. These machines slowly rotate growing chambers or "quadrants" around a horizontal axis and keep the seed and subsequent sprouts moist with intermittent sprays of water.

The rotary sprouter machine is used for growing sprouts either to full maturity or to half-term depending on the look desired. Rotary sprouters grow sprouts in bulk masses causing the sprouts to take on a "bulk" look. Such sprouts are good for packaging in bags. On the other hand, sprouts that are transplanted to trays or cups tend to grow straight up thus taking on a "turf" look. Neither method produces really safe sprouts. The saying "the proof is in the pudding" applies also in the case of sprouts. This is substantiated by the numerous outbreaks of foodborne illnesses related to eating raw sprouts, the numerous recalls, and the legitimate concerns and warnings of government health agencies. Taken all together these failures testify to one fact: The prior art does not and cannot produce safe sprouts. Additionally, outbreaks and recalls are occurring even among conscientious sprout growers who have sought to incorporate the best that the sprout equipment industry and scientific community can offer them—but it is clearly not enough! Sprouts produced commercially or otherwise in the prior art poses a serious health risk because the prior art can offer no practical, workable solution. Again, my invention provides such a needed practical, workable, and effective solution.

Prior Art—The Rotary Sprouting Machine—Part of the Problem:

Rotary sprouting machines, as mentioned, are used by virtually every sprout business who commercially produces alfalfa, radish, broccoli, clover, onion, or similar sprouts. While these prior-art machines grow the sprouts, they do nothing toward disinfecting the product. Actually, they are part of the problem. Such machines merely maintain a wet damp environment that is conducive to growing both sprouts and, unfortunately, bacteria. It should be made clear, at this point, that such machines do not offer means for washing the sprouts nor a means for eliminating pathogens. Even if a disinfectant is injected into their spray water, the pathogen problem is far too set into the product for such superficial attempts to be effective.

Sprouts such as alfalfa and the like are tender and can survive only limited concentrations of disinfectant exposure. Furthermore, spray applications of such low levels of disinfectant solutions accordingly dictated are highly ineffective. Why is this so? While a limited number of bacteria may be eliminated by any such efforts, large numbers invariably survive and continue to thrive. Such pathogens can become highly resistant and even more difficult to kill as hours go by. Not only does the sprout mass provide an ideal environment for bacteria to grow, but there is also an abundance of building blocks of proteins and other nutrients in which bacteria can coat, burrow, and fortify themselves with. Certain foodborne pathogens encase themselves in their own protective biospheres which must be stripped away or penetrated in order to reach the bacteria burrowed inside. The longer such pathogens are permitted to perfect their biospheres, the harder they are to kill. Such germs can be killed but to do it effectively it takes more than what the prior art can offer. This is especially the case considering the very limited concentration of disinfectant solution that sprouts can tolerate and survive. Even various surfactants have proven ineffective oxidizer complements. Furthermore, it is important to note that oxidizers cannot kill what they cannot contact intimately.

For non-biosphere bacteria, the proteins and organic matter surrounding them make them more difficult to wet with disinfectant. Also, the oxidizing power of any oxidant disinfectant is expended on the competing organic content of the sprout mass. These factors taken together make for a challenging problem—again, one that the prior art cannot meet. The prior art cannot offer a practical means for providing the aggressive and intimate wetting contact necessary to kill offending pathogens with the low concentrations of oxidizers such that the sprouts could survive. What is needed is persistent and repeated washings with low levels of disinfectant and with aggressive intimate contact of the disinfectant that is concurrent, frequent, and ongoing with the sprouting process. The prior art has no practical means for accomplishing such inclusions. Therefore, for these reason and any number of additional reasons, all efforts or methods devisable within the prior art have not, will not, and cannot solve the health-risks problems facing the sprouting industry today. My invention, however, offers a simple and practical means for effectively addressing all such issues as the disclosure herein will reveal.

Prior Art—Rotary Sprouter Further Explained:

The "rotary sprouter" or "rotary drum" commonly consist of a cluster of four horizontal sprout chambers or quadrants mounted together on a horizontal axle. Each quadrant or growing chamber has an open front where a door is mounted for containing the seed and sprouts. The quadrants or chambers slope to the front toward the doors where the water can drain out around the doors. Adequate drainage is important to prevent water logging and subsequent deterioration of the sprouts.

Prior Art—Unsanitary Screens in Ventilation Ports:

Rotary sprouters generally have a fan mounted on a stationary plenum that feeds air into the rotary drum's growing chambers. The fan introduces and circulates fresh air in and through the growing chamber. Accordingly, the back side of the quads has air openings as does the doors in the front for the flow-through ventilation. A weakness in this prior art, however, is that screens are installed in these openings to prevent loss of seed and sprouts. These screens are unsanitary because the mesh openings are difficult to clean and sterilize without removing from the machine. Pathogen-infected screens can contaminate subsequent crops thus contributing to the health risk associated with sprouts. A feature within my invention provides a means for retaining the product without any need for such screens thus enhancing sanitation.

Prior Art—Conclusions Regarding Rotary Sprouters

Considering the foregoing, clearly the prior-art rotary sprouter shares blame for the ineptness of the industry at producing sprouts that are free of borne-illness pathogens. Again, my invention, provides key enhancements and changes that transform the rotary sprouter machine into a sprout washing machine that can propagate, wash, and disinfect the sprouts perpetually all in virtually one simple step.

Prior Art—Other Offerings

What about other efforts in the prior art that are aimed specifically toward eliminating the pathogen problems facing the industry? Do any such discoveries or offerings provide a satisfactory solution? The follow information addresses these questions:

Prior Art—Use of Gamma Radiation:

"Research carried out by the U.S. Department of Agriculture concluded that treating alfalfa seeds and sprouts with a combination of chlorine and irradiation effectively safeguards them against contamination by *E coli* 0157:H7 and *Salmonella*. The report [from U.S. Department of Agriculture] further stated that the doses used to eliminate those organisms did not affect germination of seeds. However, the required irradiation dose is higher than the 1.0 kilogray dose allowed for fruits and vegetables. Further studies are required to confirm these preliminary reports." ("Risks Associated with the consumption of Fresh Sprouts," Sylvanus Thompsons and D. A. Powell, *Food Safety Network Technical Report* #16, 2000 July) Thus, currently treating "bad" seed and sprouts using gamma radiation is very unappealing. Furthermore, the level of public acceptance of irradiating a product that has traditionally bore a rather earthy organic health-food appeal is yet to be seen.

Prior Art—Heat Treatment of Seed "Limited Appeal":

U.S. Pat. No. 6,415,547 B1 to Katsuyoshi Enomoto 2002 Jul. 9 describes a method for sterilizing seed using heat. "Application of heat to kill pathogens on alfalfa seeds has been investigated in a study that found treatment at 57 or 60 degrees C for 5 minutes appeared to be effective in killing S stanley without substantially decreasing germability of seeds. However, heat treatment has limited appeal because there is such a fine threshold at which bacteria can be killed and germination not destroyed." ("Risks Associated with the Consumption of Fresh sprouts," sylvanus Thompsons and D. A. Powell, *Food safety Network Technical Report* #16, 2000 July)

Prior Art—Chemical Treatment:

According an article in *Food safety Network Technical Report* #16, there are several studies done on the effectiveness of chemical treatment in eliminating pathogens on seeds for sprout production, including calcium hypochlorite, sodium hypochlorite, hydrogen peroxide, ethanol, and ozone. The effectiveness of any sort of a mere seed wash is greatly limited due to micro-cracks and crevices on and in the seed. The article says that no matter how lethal the treatment solution is, if the solution cannot reach the pathogens in the seeds, it cannot disinfect the seeds effectively. Therefore, even if there is any substantial reduction of the pathogens in the "bad" seeds, none of the chemical treatments can completely eliminate harmful organisms reside in the seeds. Referring to efforts toward disinfecting the seed the same article goes on to say, "Even if only a few organisms survive a seed treatment, they can grow to high levels during sprouting and contaminate the entire batch. Therefore, disinfection alone cannot be relied upon to ensure the safety of sprouts. The best results were obtained with the use of calcium hypochlorite; thus approval was granted for its use at 20,000 ppm." ("Risks Associated with the Consumption of Fresh Sprouts," sylvanus Thompsons and D. A. Powell, *Food safety Network Technical Report* #16, 2000 July)

Prior Art—FDA Guidelines:

"Despite the efforts by industry, government agencies, and academia to make sprouts safer, outbreaks continued to occur. It was therefore obvious that approved treatments, such as the routine use of seed disinfection treatment with 20,000 ppm of calcium hypochlorite, could not guarantee a safe product. This resulted in the FDA issuing new guidelines for the sprouting industry in October 1999." ("Risks Associated with the Consumption of Fresh Sprouts," sylvanus Thompsons and D. A. Powell, *Food Safety Network Technical Report* #16, 2000 July)

"The sprout guidance identifies a number of areas, from the farm to the sprouting facility, where FDA believes immediate steps should be taken to reduce the risk of sprout-associated foodborne illness. Specific recommendations in the guide include: development and implementation of Good Agricultural Practices and Good Manufacturing Practices in production and handling of seeds and sprouts; seed disinfection treatment; microbial testing before the product enters the food supply; and provision for trace-back. The guide recommends that seed should be subjected to one or more treatments that have been approved for reduction of pathogens on seeds and sprouts. This is to be followed by microbial testing of the spent irrigation water form each production lot to ensure that nay contaminated batch is not distributed. Test results before shipping products. The second document outlines the detailed procedures to be followed in implementing the testing." ("Risks Associated with the Consumption of Fresh Sprouts," Sylvanus Thompsons and D. A. Powell, *Food safety Network Technical Report* #16, 2000 July)

Still, it only stands to reason in the light scientific scrutiny and evidence that the FDA guidelines for disinfecting seeds and sprouts are not effective and will not be effective at getting rid of the foodborne illness problem associated with raw sprouts.

Prior Art—Ineptness Casting a Dismal Outlook:

"A great deal of effort has been spent by the research community trying to come up with ways to reduce the contamination in seeds. Despite these efforts, none of the intervention strategies developed to date are effective in achieving a complete elimination of pathogens in seeds or preventing re-growth of pathogens during sprouting. ("conclusions," *Sprouter's Journal*, ISGA, Summer 2001, vol. 12, no. 1, p. 8)

To the people in the sprouting industry who make their living selling sprouts, the following speculative "solution" is a scary one indeed: "In the future, it might be useful to explore other strategies such a mandatory warning labels on individual packages offered for sale at retail outlets." ("Risks Associated with the Consumption of Fresh Sprouts," sylvanus Thompsons and D. A. Powell, *Food safety Network Technical Report* #16, 2000 July)

Little wonder, therefore, that a state of desperation for a solution to this plaguing problem is permeating the sprouting industry as is reflected in the following excerpt from a "Letter to ISGA Members" August 2004: "The International Sprout Growers Association (ISGA), and its Technical Review Board (TRB), are committed to addressing and eliminating the safety problems which have plagued the sprout industry. Its is necessary to work as quickly and effectively as possible to this end, and this will require the greatest level of cooperation and trust within the sprouting industry, and in both directions between the industry and the regulatory community." ("Letter to ISGA Members," Bob Sanderson, President of ISGA, 2004 August)

Again, my invention provides key and practical enhancements that change and transform the rotary sprouter machine from a germ paradise into becoming an effective disinfecting washing machine. The potential of my invention for offering a simple, practical solution to the problem is unsurpassed by any solution ever before offered. Furthermore, my invention offers additional benefits to the health of the sprout itself which encourages extended shelf life, market appeal, and value of the sprouted products.

OBJECTS AND ADVANTAGES

Accordingly, several objects and advantages of the invention are:

(a) to provide a practical, economical, and effective means for disinfecting seed and sprouts;

(b) to provide a means for reducing labor by combining seed and sprout washing operations within the same apparatus as used to propagate the sprouts;

(c) to provide a means for saving on extensive employee training without compromising such important tasks as disinfecting and propagating the seed and sprouts;

(d) to provide a means for enabling unskilled persons produce sprouts offering the greatest likelihood of being safe and consistently free of dangerous foodborne pathogens and to enable such workers do so without regard to:

whatever pathogens the seed may have had on the surface, whatever pathogens the seed may have had embedded within its interior, or, whether a minor degree of negligence in personal hygiene on the part of the operator might occur, for example: handling the seed or machine's food contact surfaces with unsanitary unwashed hands (its bound to happen);

(e) to provide a means for combining the sprouting process with an inherent ability to perform multiple disinfectant washings concurrent with, during, and throughout, as needed, the entire sprouting cycle;

(f) to provide a means whereby such washings can be carried out without the need for human involvement beyond a mere initiation of the process;

(g) to provide a means whereby such disinfectant washings can easily be carried out as frequent and as often and with as many repetitions as is necessary to get the job done;

(h) to provide a means for directing such washes to occur with such a degree of persistence that it exceeds the level of resistance of the enemy pathogens;

(i) to provide a means for the machine to perform helpful self-cleaning of the machine itself;

(j) to provide a means that is easy and economical to automate the entire process of washes and rinses along with the concurrent and combined propagation processes;

(k) to provide a means for retaining the sprouts in the growing chambers without screens over the air ventilation ports thus eliminating the need for screens as such screens tend to be unsanitary and hard to clean;

(l) to provide a means for flood cooling the sprouts to remove excess heat whereby the watering can temporarily halted for a relative extended period of time thus facilitating and enabling:

introduction of probiotics into the sprout mass which can, in turn, serve as defenders, an extended no-rinse period of time such that the probiotic bacteria can establish themselves without being quickly rinsed away and without building excess heat;

(m) to provide a tilt-back position whereby the quadrants can be more easily loaded without concerns of the seed rolling back out the front-door opening—as is tendency with the prior art chambers—all of which slope forward for drainage;

(n) to provide a means for enabling the effective use of lower concentrations of disinfectants—such levels being well below what the sprouts can tolerate—and yet still accomplish effective disinfection results;

(o) to provide a superior alternative to the FDA's 20,000 ppm chlorine calcium hypochlorite recommendation for washing seed such alternative needing only two to three digit ppms of oxidants and still attaining superior results;

(p) to provide a means that eliminates the need for using such hazardous and unhealthy levels of chlorine thus increasing operator safety; furthermore, reducing the chances of a wrathful rebuke from the EPA (Environmental Protection Agency);

(q) to provide all such objects and advantages utilizing common and inexpensive components that have a history of reliable long lives, are mass produced, and are readily available within a competitive field thus helping hold manufacturing costs;

(r) to provide all such objectives and advantages with only a few additional parts and thereby providing a designed that is mechanically easy to understand, easy to maintain, and one that generally would not require on-site specialists for performing mechanical maintenance;

(s) to provide a machine design that performs said advantages with minimal moving parts—for simpler and more economical manufacturing;

(t) to meet the needs of the sprouting industry for shipping safe sprouts without the need of introducing a strange or foreign process that might be met with market resistance; my invention wonderfully transforms a machine that sprout growers already basically understand into a multi-purpose "dynamo" that can meet their needs well.

(u) to be able to meet the aforesaid needs of sprout growers and operators without burdening them with a heavy learning curve or a bunch of complicated procedures;

(v) to transform the growing chamber or quadrant from a sloth-like sprout roller into a dynamic agitator by the simple addition of rib-like intrusions thus fulfilling a necessary agitation role for accomplishing disinfections.

(w) to provide a means for facilitating the use of ozone by providing the wash water holding effect whereby ozone be circulated deeply into the hiding places of enemy bacteria.

(x) to provide a highly practical means for consistently growing good sprouts from bad seed;

(y) to provide an economical and practical means for vanquishing microbes that cause deterioration thus extending the sprouts' shelf life;

(z) to provide a means for providing a three dimensional motion that, when coupled with rotation, facilitates agitation thus helping assure fully homogenous washing action which in turn:

ultimately assures that all of the product's surfaces are swirled under, turned, and turbulated for getting the disinfectant into contact with the pathogens.

ultimately turbulates air bubbles out the seed hulls and sprout crevices thus displacing such air with turbulated disinfectant.

utilizes turbulated disinfectant to erode the pathogens' cover thus enabling oxidation for desired disinfection.

(aa) to provide a means for timely exploitations of the continuum of sprout growth, expansion, and movement wherein a disinfectant can access any newly-exposed, formally-enclosed or out-of-reach bacteria.

(bb) to provide a practical means for timely wash repetitions such as would not to permit extend opportunities for bacteria to burrow, to coat themselves with protective proteins, nor to produce protective biospheres—all of which can help the bacteria become more resistant over time.

Further objects and advantages are to be able to accomplish such repeated disinfections without damaging or compromising the health of the sprouts. Another object is to enhance the viability of sprouts by "gently" unburdening them of parasitic microbes that causes rot. Still further objects and advantages will become apparent from a consideration of the ensuing description and drawings.

SUMMARY

In accordance with the present invention a rotary sprouter machine is modified with the addition of a pivot such that the entire growing chamber assembly can be tilted back as powered by a pneumatic or hydraulic cylinder or other means. The tilted-back position thus creates a containment that can be filled with disinfectant to effectively transform the rotary sprouter into a front-load type washing machine. The apparatus can therefore automatically wash and agitate the sprouts to accomplish an amazing number of benefits. Other improvements facilitate the washing action, enhance sanitation characteristics, or open the way for better and creative sprouting techniques for promoting overall health of the sprouts.

DRAWINGS—FIGURES (Please note that objects in the drawings may be rendered as though transparent.)

DRAWINGS—REFERENCE NUMERALS

20 Stationary base frame
22 Main frame pivot
24 Pivoting frame
26 Pneumatic cylinder's pivot mount and pin
28 Pneumatic push/pull cylinder
30 Adjustable tilt stop base
30a Adjustable tilt stop threaded rod
30b Adjustable upper stop bar
30c Adjustable lower stop bar
30d Stop bar bumpers
30e Nuts for hold Adjustable Bars 30b and 30c
36 Gearmotor—slow speed for turning sprout chambers
38 Drive train cover
40 water rotary union
42 control box
44 sprouting quadrant or chamber
44a Quadrant frame—cross
44b Axle
45 Quadrant's outer flange
45a Quadrant's ribs for agitation and to facilitate sprout tumbling
46 Removable door or cover—allows water drain where door contacts the quadrant 44
46a Door retainer U-hook

46b Hole in center of plateau of conical shaped protrusion on door 46

46c Door retainer rod assembly

46e Conical protrusion molded into plastic door 46.

46f Flatbar of 46c that can be bent to adjust for proper door fit

48 Front spray bar

48a Spray nozzle

DETAILED DESCRIPTION—PREFERRED EMBODIMENT—FIGS. 1–7b

Figure 1:
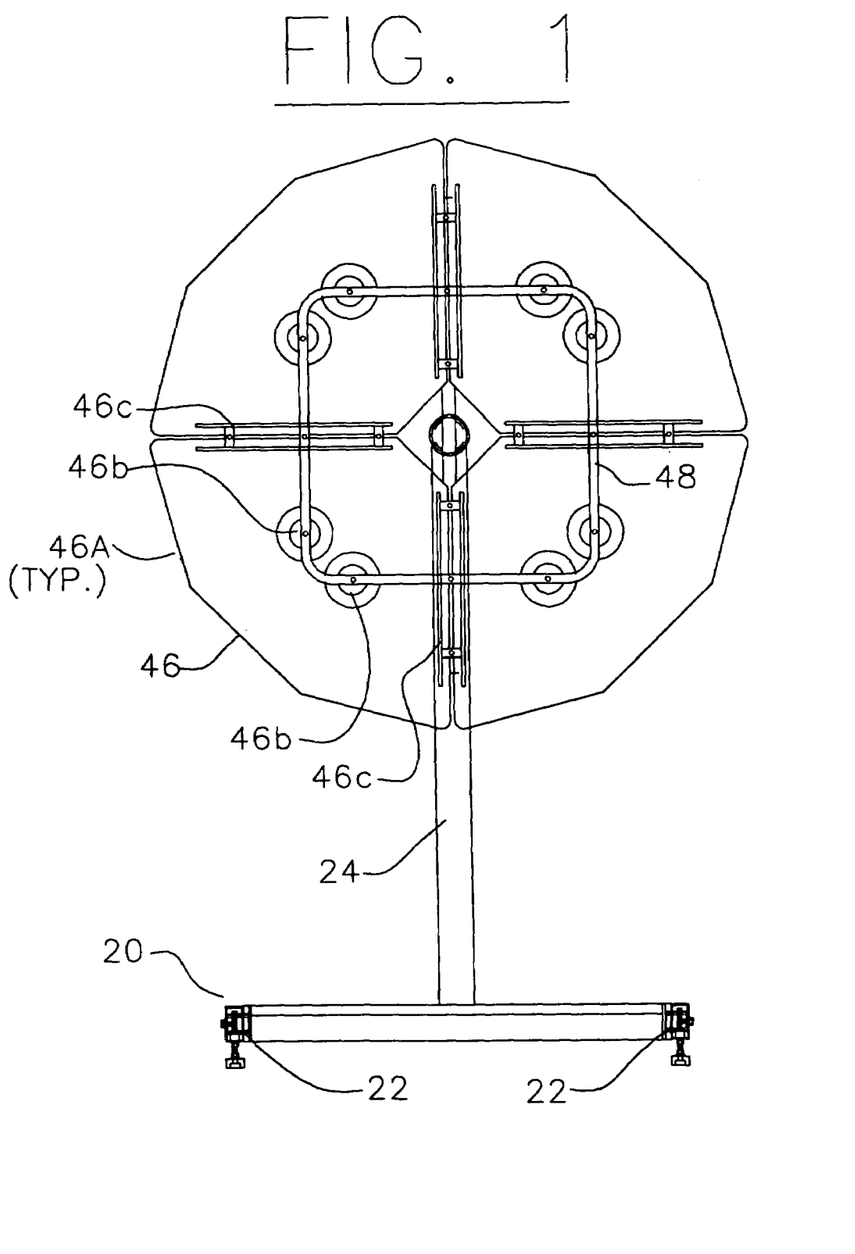
FIG. 1 shows front view of a preferred embodiment with doors attached.
Figure 2:
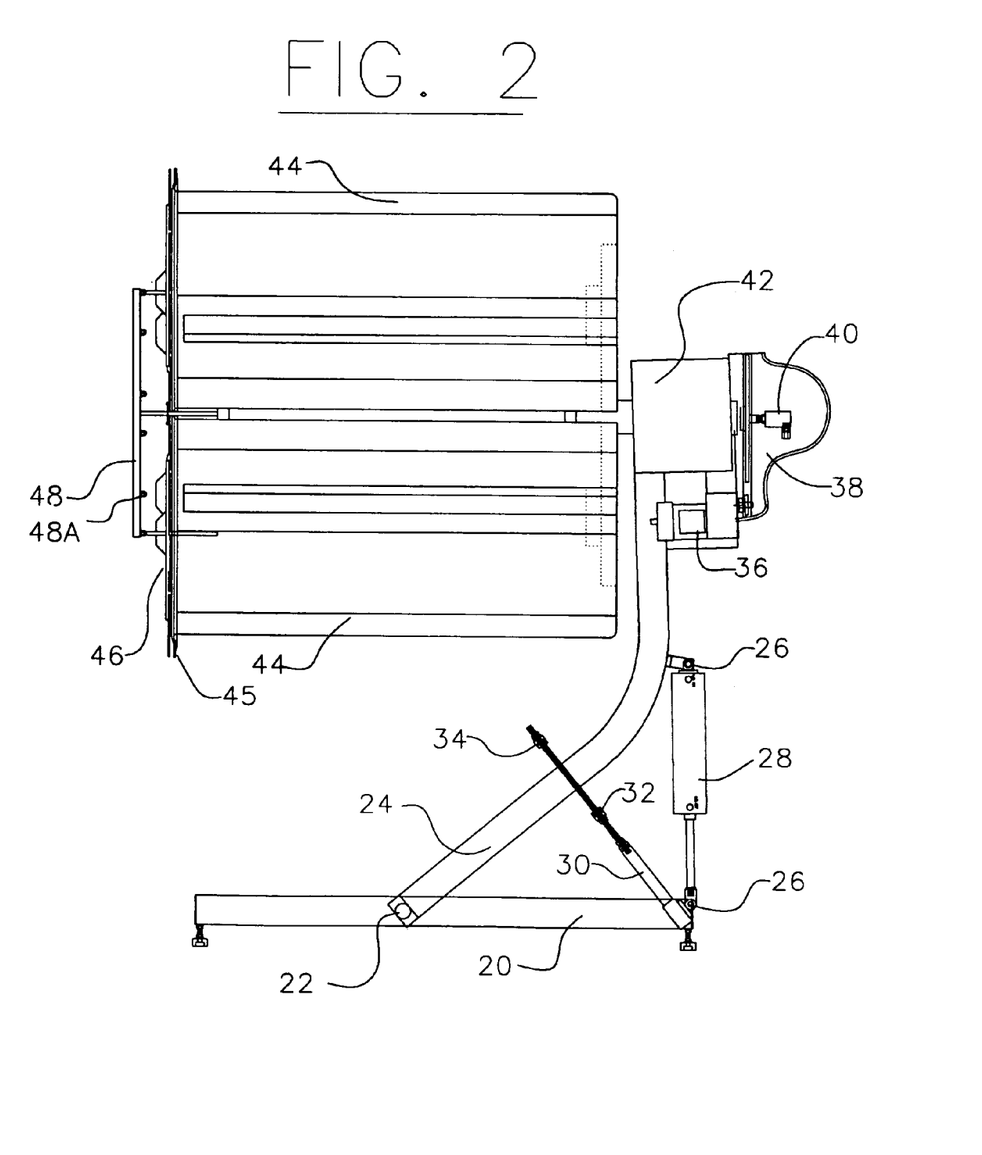
FIG. 2 is side view of the machine in its upright (normal) position.
Figure 3:
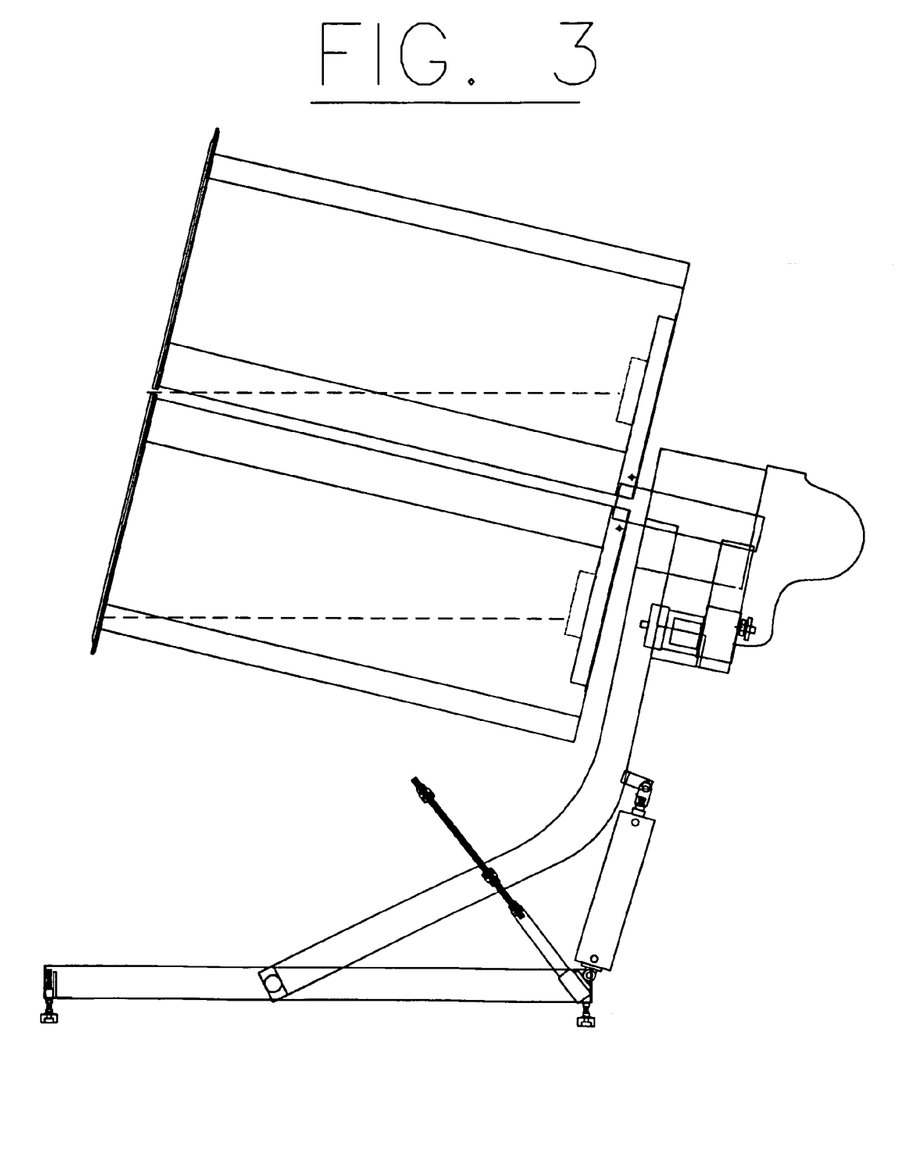
FIG. 3 is side view in the tilted back position. Notice lines representing water levels as the water can be contained in this position. Further tilting back, however, is certainly an embodiment of this invention.

Tilting Motion:

FIG. 2 shows a side view of the preferred embodiment. A stationary base frame 20 has a pivoting socket 22 wherein the pivoting frame 24 is able to move freely to accomplish a back-and-forth tilting motion. FIG. 3 shows the machine in the tilted back position. The pivot point 22 can include a bronze bearing to facilitate free tilting motion.

Figure 5:
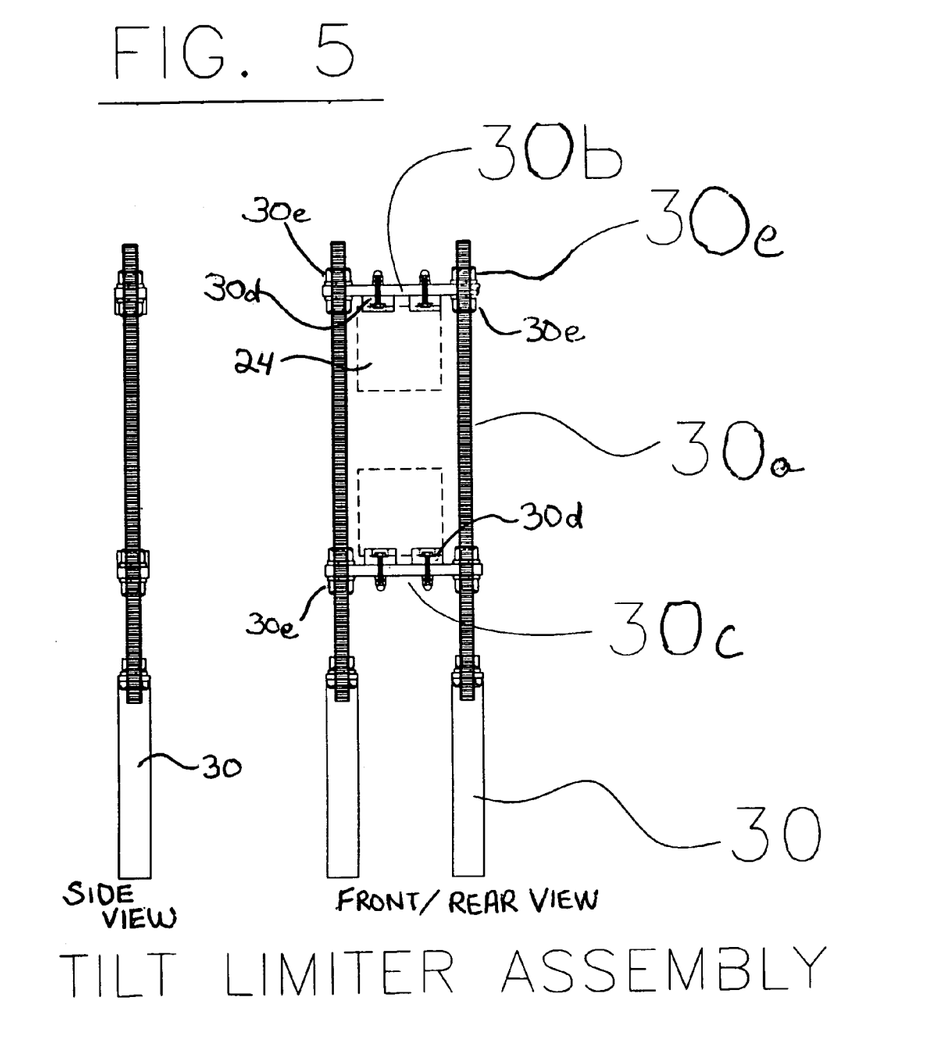
FIG. 5 shows an assembly for limiting the travel of the tilting motion by means of adjustable positioning of the stops.
Figure 6:
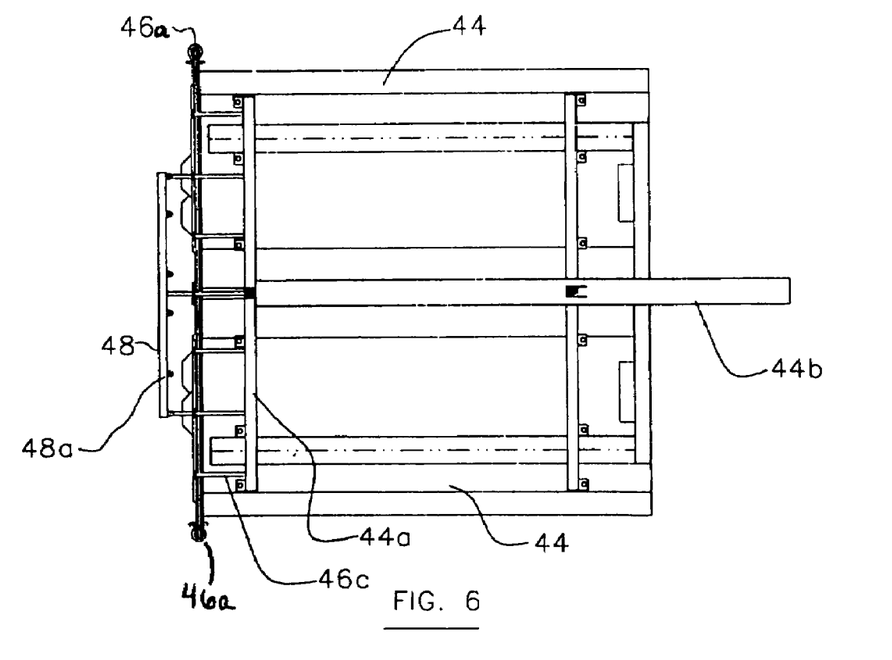
FIG. 6 shows a side view of the quadrant assembly. Note that 2 quadrants are removed for viewing the axle assembly with its attached door holder 46c.
Figure 6A:
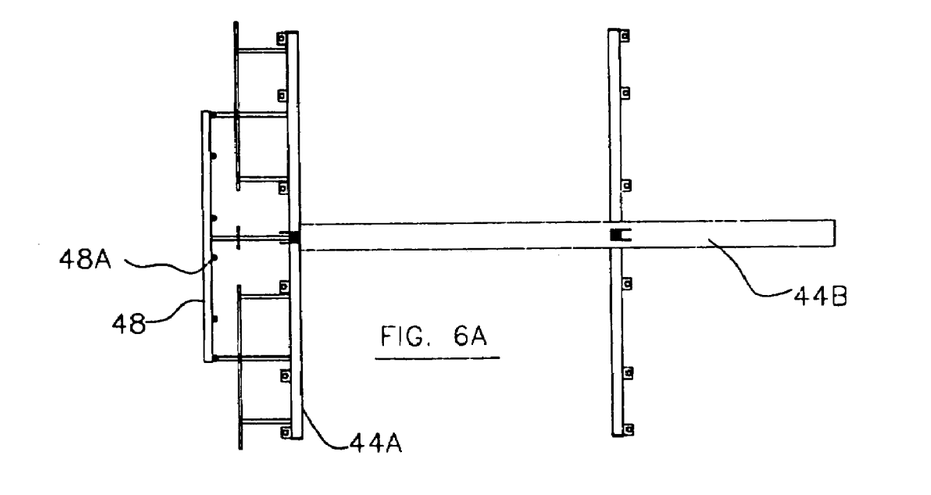
FIG. 6A shows side view of the axle assembly without quadrants.
Figure 6B:
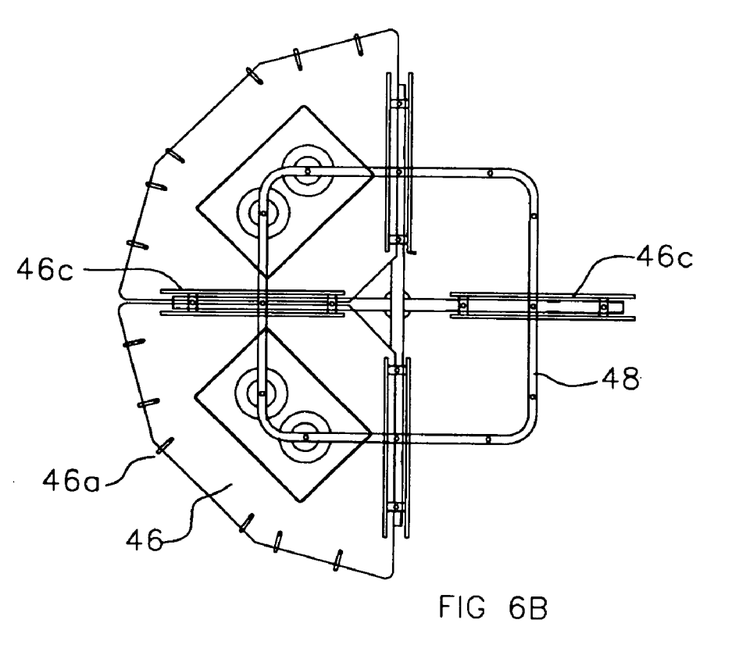
FIG. 6B shows side view of axle assembly with 2 quadrants installed on the left side of the frame.
Figure 6C:
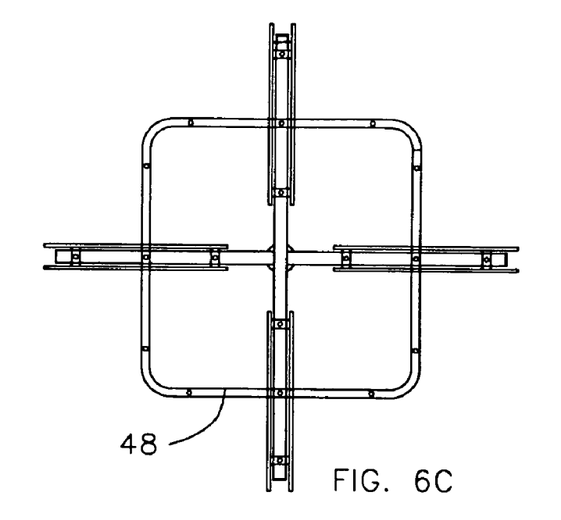
FIG. 6c shows front view of axle assembly with no quadrants installed.
Figure 6D:
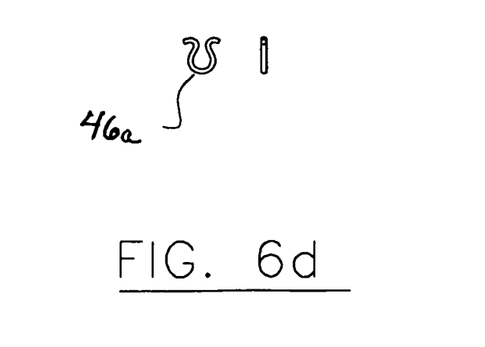
FIG. 6D is the door "U" hook that locks the door in position when slipped over the door and the quadrants outer flange 45.

The tilting movement is powered by a pneumatic or hydraulic push/pull cylinder 28 (FIG. 2). The cylinder is attached to the stationary base frame 20 by means of a connecting pivot mount 26. The cylinder is also attached to the tilt frame 24 by means of a pivoting mount 26. Pressurized air actuates the cylinder through a standard pneumatic control valve such as a 4-way pneumatic solenoid valve. The pneumatic solenoid valve air connections are configured to maintain the machine in it normal posture of FIG. 2 even when there is no power. The travel stop bar 30b can be seen in FIG. 2. A detailed drawing of this assembly can be seen in FIG. 5. The upper stop bar 30b can be adjusted using the nuts 30e to stop the upward travel of the main trunk member 24 such that the quadrants can drain the water to the front as is normally the case. 30d of FIG. 5 are rubber or plastic bumpers (optional) for facilitating landing of 24. The 4-way air valve is controlled by an electrical control system that utilizes a programmable logic controller (PLC). A single direction cylinder could also work depending on the balance of the tilting frame construction. I prefer a double acting push-pull cylinder. A tilt limiter assembly entailing 30a, 30b, 30c, 30d, and 30e is detailed in FIG. 5. This assembly enables the adjusting of the limits of travel of the pivoting frame 24. The positions of the adjustable stops 30b and 30c are adjusted with the nuts 30e on the threaded rod 30a.

Speed control valves should be incorporated for controlling the speed of the pneumatic cylinder so as to attain the tilt-back position within approximately 20 seconds. The same approximately 20 seconds would apply for the forward motion as well.

Figure 4:
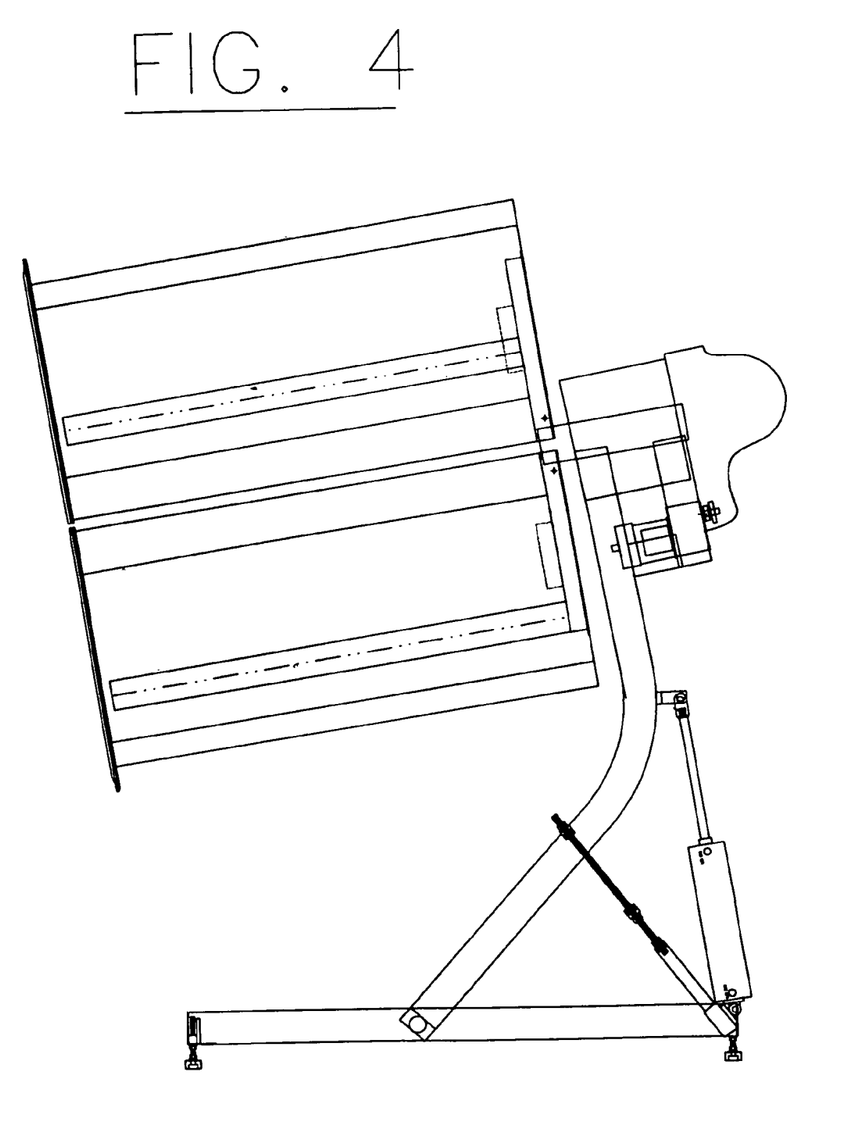
FIG. 4 is a side view of a preferred embodiment in its tilted-forward position (optional).

FIG. 4 shows the quadrants tilted in the forward position. This is an optional position. A dual stage cylinder could be used to attain the 3 positions: 1) back, 2) normal position—positions the quadrants so water can drain out the front, and 3) the forward position that could be useful such as for facilitating unloading though I do not consider this position essential. The preferred embodiment utilizes the back and normal positions only for normal sprouting.

In alternate embodiments, the tilting can be powered by a hydraulic cylinder or by electrical linear actuators, or by large gear actuation.

Controls:

The machine typically would be controlled by Programmable Logic controller PLC control system that would be mounted in control box 42.

Chemical Pumps:

The control system would also activate chemical feed pumps as needed. One pump for pumping in disinfectant such as a chlorine based product or such as hydrogen peroxide, a 2nd pump for pumping in a probiotic lactic bacteria. The germicidal product is feed into the machine's water line during the wash/disinfecting cycle to make a solution that fills the quadrants to the desired fill level.

Ozone:

The control system could also activate an ozone flow concurrent with the feeding of the hydrogen peroxide for a synergetic effect of the two combined.

Plumbing:

A rotary union 40 in FIG. 2 is used to feed water approximately 70 degree F. into the rotating axle's 44b plumbing which delivers water to the spray bar 48 and is sprayed into the quadrant 44 using the spray misters 48a installed on the front spray bar 48 assembly. The misters 48 are mounted on a spray bar 50. FIG. 2 shows a front mounted spray bar that sprays from the outside through openings in the quadrant doors 46. Other nozzles can facilitate the watering. In the preferred embodiment, a corresponding number of nozzles spray from the back side of the quadrant through an opening in the back center of each quadrant.

Rotation Drivetrain:

A gearmotor 36 and chain drive effects a slow rotation of the growing chambers 44 quadrant assembly. The controls in the control box would have the ability to effect both forward and reverse rotation of the quadrants for effective cleaning action.

Figure 8:
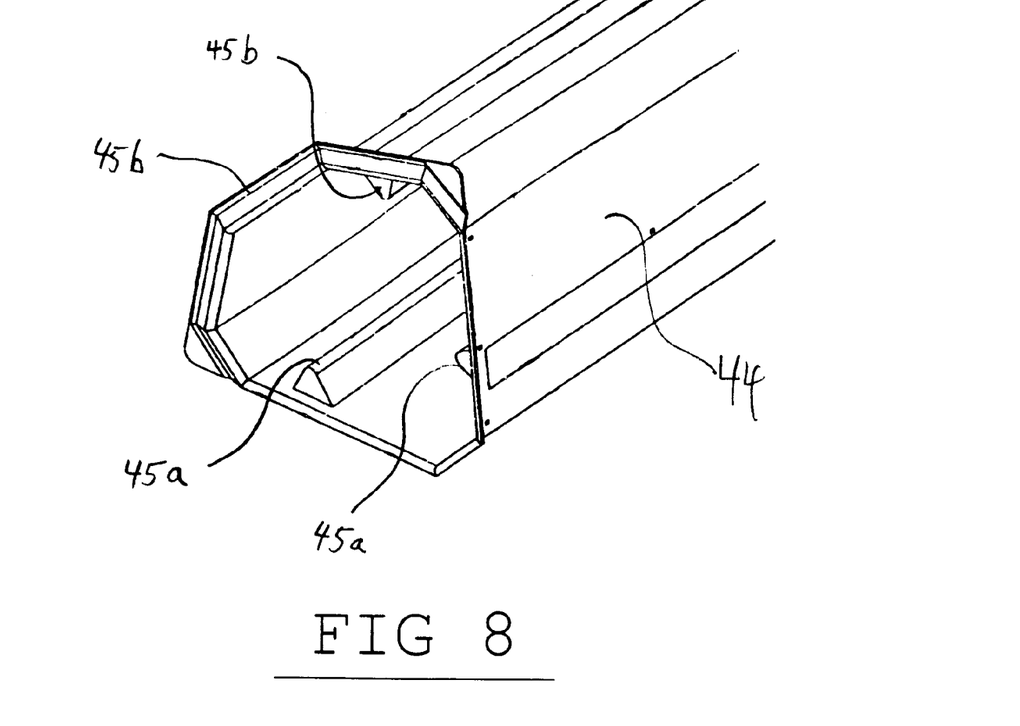
FIG. 8 shows a 3 dimensional front view of a growing chamber quadrant that is not mounted on the machine.

Quadrants or Sprout Chamber(s):

The growing chambers in the preferred embodiment are of molded durable plastic. FIG. 8 shows a detailed view of the quadrant of the preferred embodiment. Ribs 45a facilitate agitation of the product for more effective cleaning.

The growing chambers 44 are of a sanitary design that is easy to clean and disinfect. There are four growing chambers 44 shaped as drawn in FIG. 8, FIG. 2, and FIG. 3 in the preferred embodiment.

The front of the quadrants are open until a door is installed. The rotary growing chamber preferably has molded in ribs 45a as drawn to facilitate agitation and redistribution of sprouts within the sprout mass. The preferred embodiment places a rib at the base of each change of angle of side walls to catch and hold the sprouts as the chamber rotates. The quadrant 44 shape as shown therefore has 3 such ribs.

Doors:

The quadrant door 46 is a clear plastic for light transmittancy for greening purposes. FIG. 7A shows the front view of the door. FIG. 7B shows the dissected end view to show the protrusion and holes where the water sprays in and air blow in from the rear of the quadrant can pass through.

Figure 7:
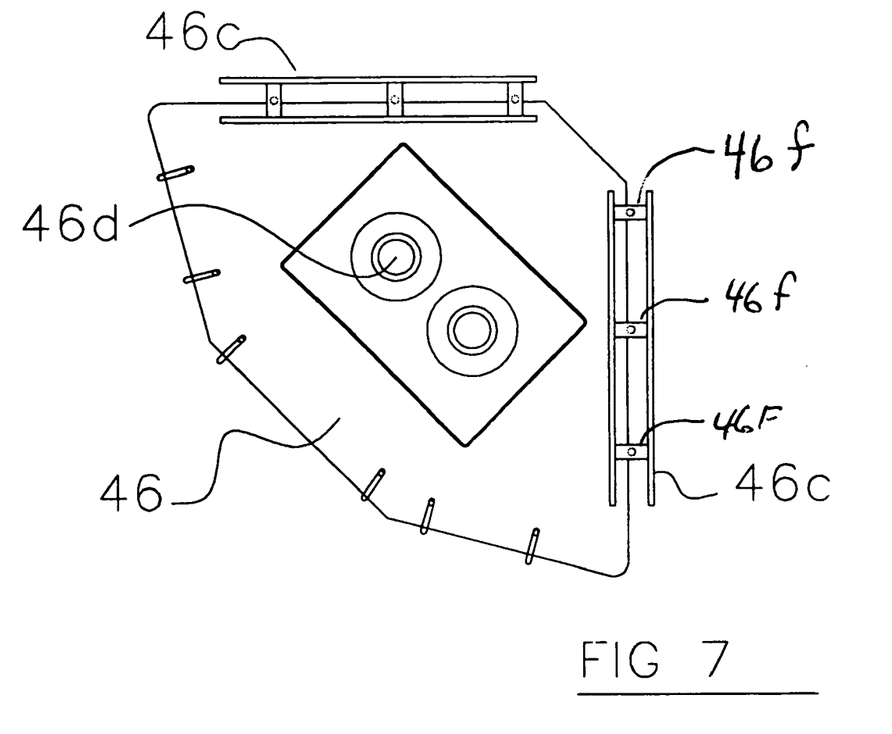
FIG. 7 Shows a front view of the molded plastic door 46 with its door retainer 46c.
Figure 7A:
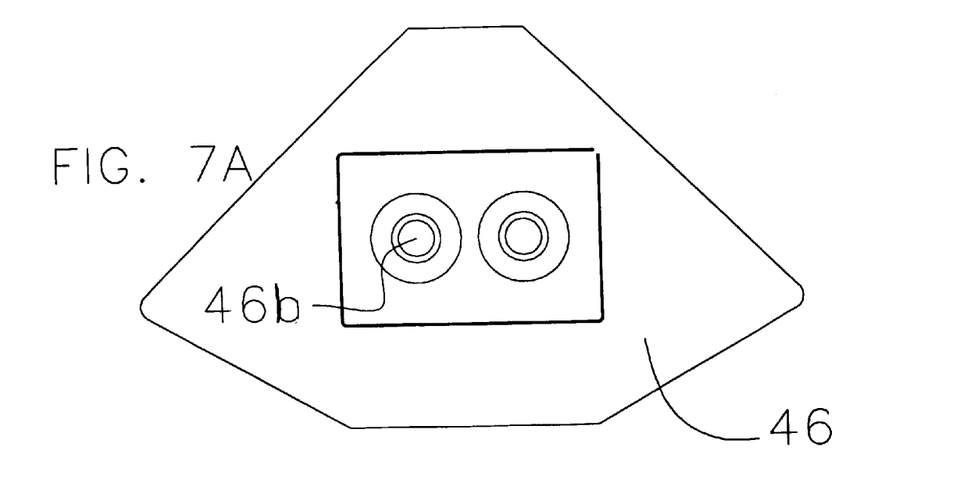
FIG. 7A shows a front view of the plastic door 46
Figure 7B:
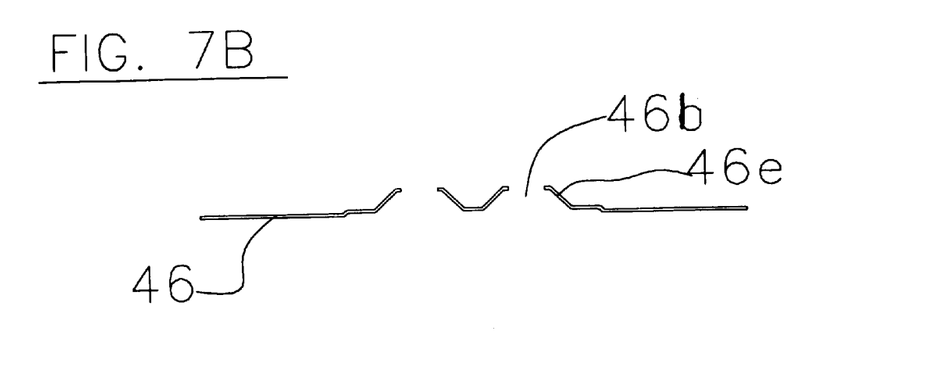
FIG. 7B shows a profile view of the door 46 showing cone shaped protrusion with a hole.

A door 46a is placed over the front of the quadrant and slid under the door retainer rods 46c—FIG. 7. The flatbar holding 46c's rods is of a thickness that is sufficiently rigid to hold the doors in place but that can be bent to accommodate tolerances of the molded quadrant. The idea is to hold the door such that water can drain between the door and quadrant but still retain the seed which can be quite small. The flatbar holding the rods of 46c enable such adjustment and at the same time offer sanitary advantages over the bolted doors. Essentially these door holders are suspended between the quads supported by a rod like member coming off the spokes 44*a* that hold the quadrant to the rotating frame assembly.

Chemical Feed Pumps:

Chemical feed pumps feed into the water line feeding the machine or into the machine's water line for adding a disinfectant such as hydrogen peroxide or sodium or calcium hypochlorite. A second feed pump feeds into the main water line that feeds in a solution of beneficial bacteria.

Operation—Preferred Embodiment—FIGS. 1–7*b*

The action is controlled by a Programmable Logic Controller (PLC) control system. Basically the program would rotate the drum or contain(s) slowly during propagation, for example: 1 revolution per 1–6 hours and faster, for example, 1 rev/min when washing/sanitizing. The washing cycles can be repeated every 2–8 hours as needed kill the germs.

A typical wash cycle might go like this: To begin wash cycle, tilt the machine back and flood with water while adding concurrently by a chemical feed pump a disinfectant such as hydrogen peroxide or chlorine-based product. Flooding and filling the chamber sufficiently to where it is spilling out the front. Rotate the chambers approx ½ turn forward, ¼ turn backwards. Continue this action for several minutes while also tilting forward. This will facilitate getting all the product under solution and agitation. Continue such action for several minutes until solution has drained out of the front of the machine.

Afterwards, resume normal misting of the sprouts intermittently as normally is the case with rotary sprouters.

After an adequate number of wash cycles have been accomplished to eliminate bacteria, feed in probiotics bacteria as discussed herein above.

Continue rotation/misting cycles as normal. However, as the mass becomes larger with a greater tendency heating up, the control program can rock the machine back and flood doing a similar motion as the disinfecting cycle above . . . only with less rotation to avoid balling of the sprouts. Rotation is generally programmed to rotate slower as the mass becomes more mature (see upper timing range above) to avoid balling of the product.

Figure 9:
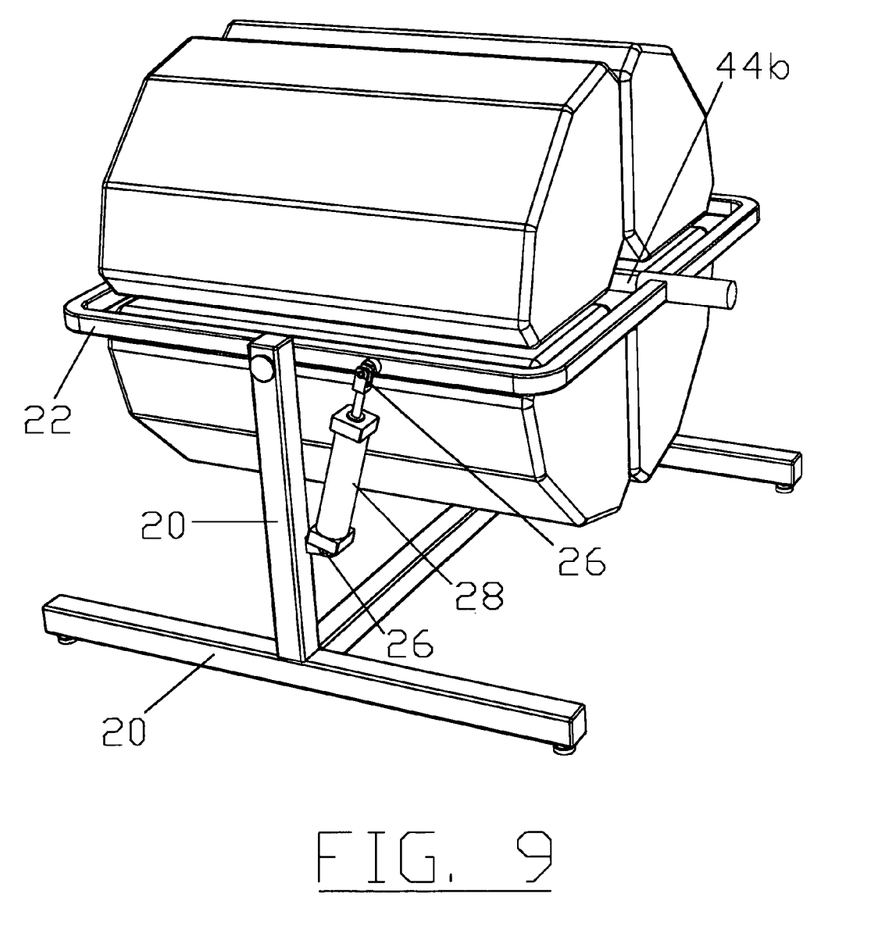
FIG. 9 shows a tilting frame as an alternative embodiment. The frame shown would hold a rotating growing chamber or a quadrant-like assembly. This particular sketch shows a non-cantilever frame even though a cantilever configuration could also work.
Figure 10:
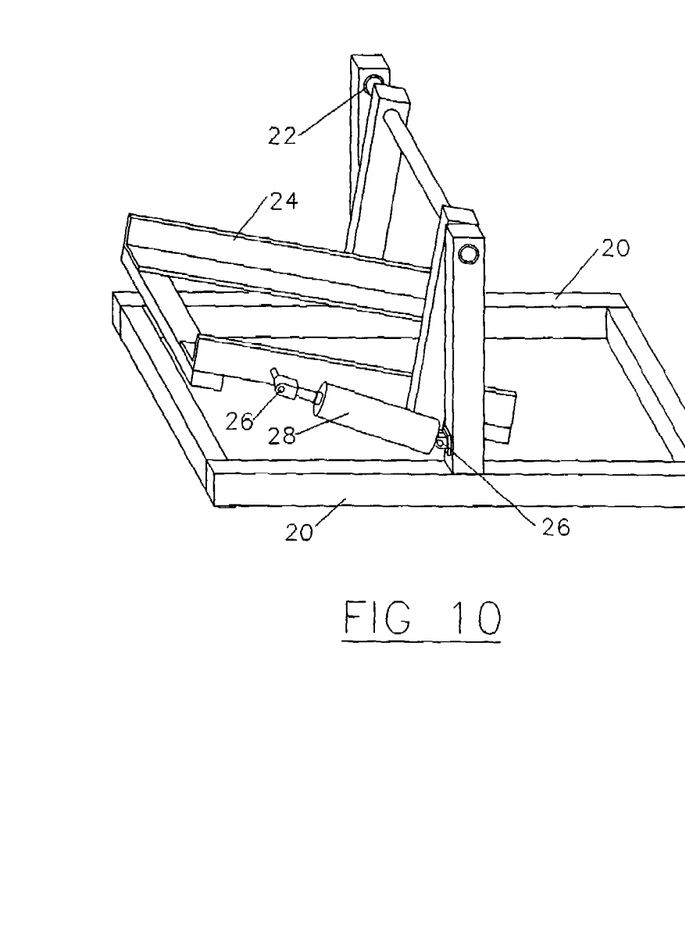
FIG. 10 illustrates an alternative embodiment rocking/tilting rack. This rack would hold a rotary sprouter and provide the tiling motion. The rotary sprouter would be locked on my bolts or clamping to the powered tilting frame.
Figure 11:
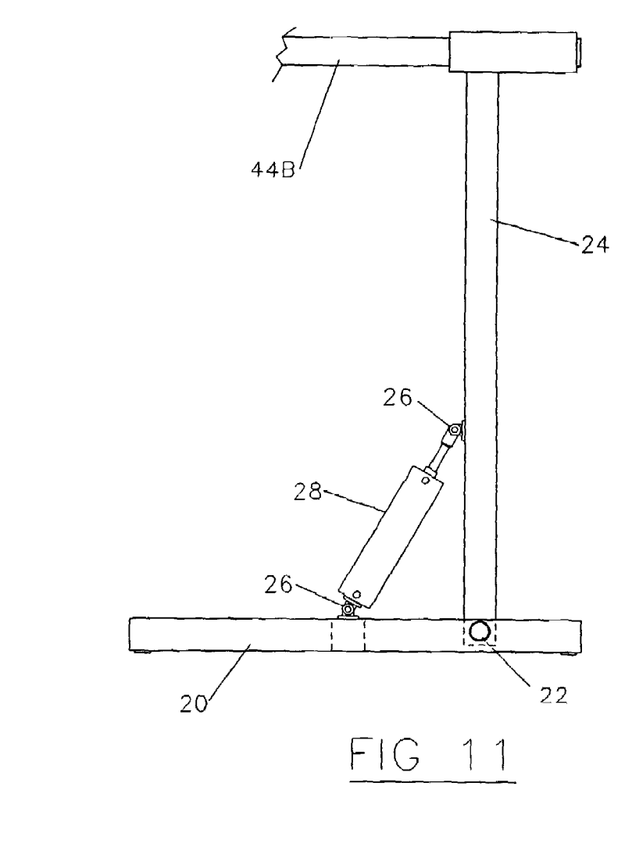
FIG. 11 illustrates another alternative embodiment showing a pivoting frame for accomplishing the desired tilting action. The axle 44b is shown that would support the growing chamber or quadrants.

Description—Alternative Embodiment—FIGS. 9–11

FIGS. 9, 10, and 11 essentially show the same Rock-a-bye action accomplished by the concept of my invention. There are any number of ways to tilt a open-front sprout chamber. It is the action in itself that is key to producing so many beneficial results.

FIG. 9 shows a tilting base frame configuration for mounting a growing chamber axle, growing chambers, drive, etc. The drawing shows a non-cantilever support for the axle as it would be supported by bearings and the axle holding growing chambers such as 46

Operation—Alternative Embodiment—FIGS. 9–11

The principle of operation is essentially the same as the preferred embodiment. The key being tilting back the growing chambers such that they make a containment that can be flooded with cleaning solution for washing the sprouts.

CONCLUSION, RAMIFICATIONS, AND SCOPE

Accordingly the reader will see that, according to the invention, I have provided practical means for transforming a rotary sprouter into a sprout washing machine for disinfecting seed and the sprouts that follow.

While the above description contains many specificities, these should not be construed as limitations on the scope of the invention, but as exemplifications of the presently preferred embodiments thereof. Many other ramifications and variations are possible within the teachings of the invention.

Thus the scope of the invention should be determined by the appended claims and their legal equivalents, and not by the examples given.

I claim:

1. A rotary seed and sprout washing, sanitizing, and/or propagating apparatus, comprising:
    (a) a vessel or an assembly of vessels for containing seed or sprouts that rotates around an axis;
    (b) a support carriage for said vessel or assembly of vessels, said carriage providing rotatable support to said vessel(s) for rotation of same about an axis that is variable along a substantially vertical plane by means of a pivoting carriage;
    (c) said carriage mounted on a pivot or a plurality thereof that is attached to or supported by a base;
    (d) said carriage pivots on said pivot mount(s) about its axis of a substantially horizontal axis, that is substantially of a right angle to the axis of said rotating vessel or vessel assembly;
    (e) a drive means to rotate said vessel or vessel assembly on said rotatable support;
    (f) a drive means to pivot said carriage about its said axis;
    (g) a liquid feeding apparatus or plurality thereof that feeds water or solution into said vessel(s) to the seed or sprouts;
    (h) said rotatable vessel(s) being adaptable to thoroughly drain out all water or solution while retaining seed and sprouts when said pivotable carriage inclines the rotation axis of the vessel(s) sufficiently in a certain direction for complete and thorough drainage, such retaining of seed being the case with or without vessel(s) rotation;
    (i) said rotatable vessel(s) being adaptable to contain a substantive amount of water or solution when said carriage is pivoted substantively in the direction opposing aforesaid draining position;
        whereby said vessel(s) can be postured for effective water or solution containment, which coupled with the motion capabilities, enable seed and sprout submersion and agitation alternated with thorough draining, to significantly benefit product washing, rinsing, sanitizing, and/or propagation objectives.

2. An apparatus according, to claim 1 wherein said drive means to pivot said carriage comprises a pneumatic cylinder mounted between said base and said carriage.

3. An apparatus according to claim 1 wherein both said drive means and said liquid feeding apparatus(es) are controlled by an automated control system.

4. An apparatus according to claim 3 wherein said control system comprises of a programmable logic controller (PLC) with software;
    whereby said components in claim 1 can be automatically controlled to effect seed/sprout propagation care objectives and automatically controlled to execute automatic wash cycles utilizing disinfectant solution(s) with said wash cycles being repeated automatically as persistently as is necessary for the elimination of food born pathogen risks associated with fresh sprouts.

* * * * *